July 3, 1951  G. CHAUSSON  2,558,819
AIRFOIL STRUCTURE AND METHOD OF MAKING SAME
Filed Nov. 30, 1945  3 Sheets-Sheet 2
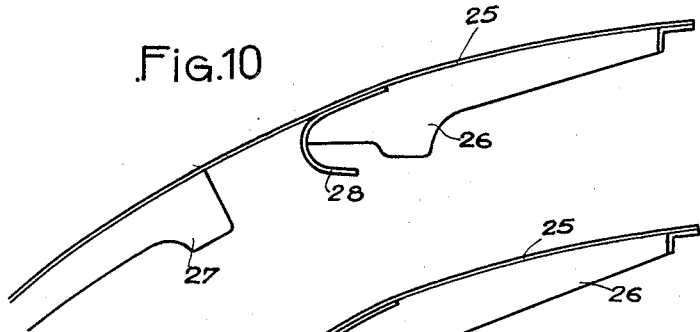
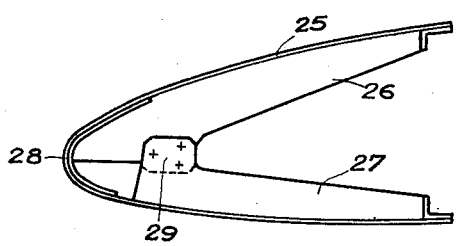
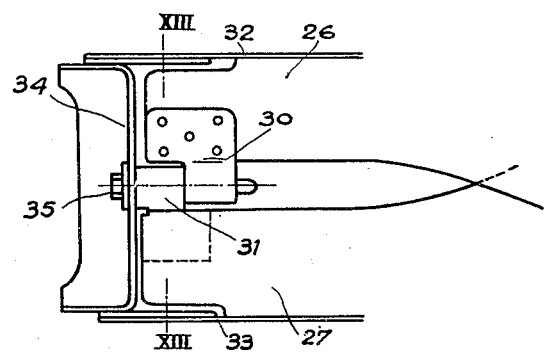
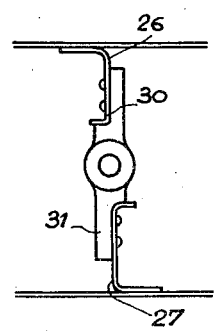
Inventor
Gaston Chausson
by
Atty Inventor
Gaston Chausson
by James Irwin
Atty.

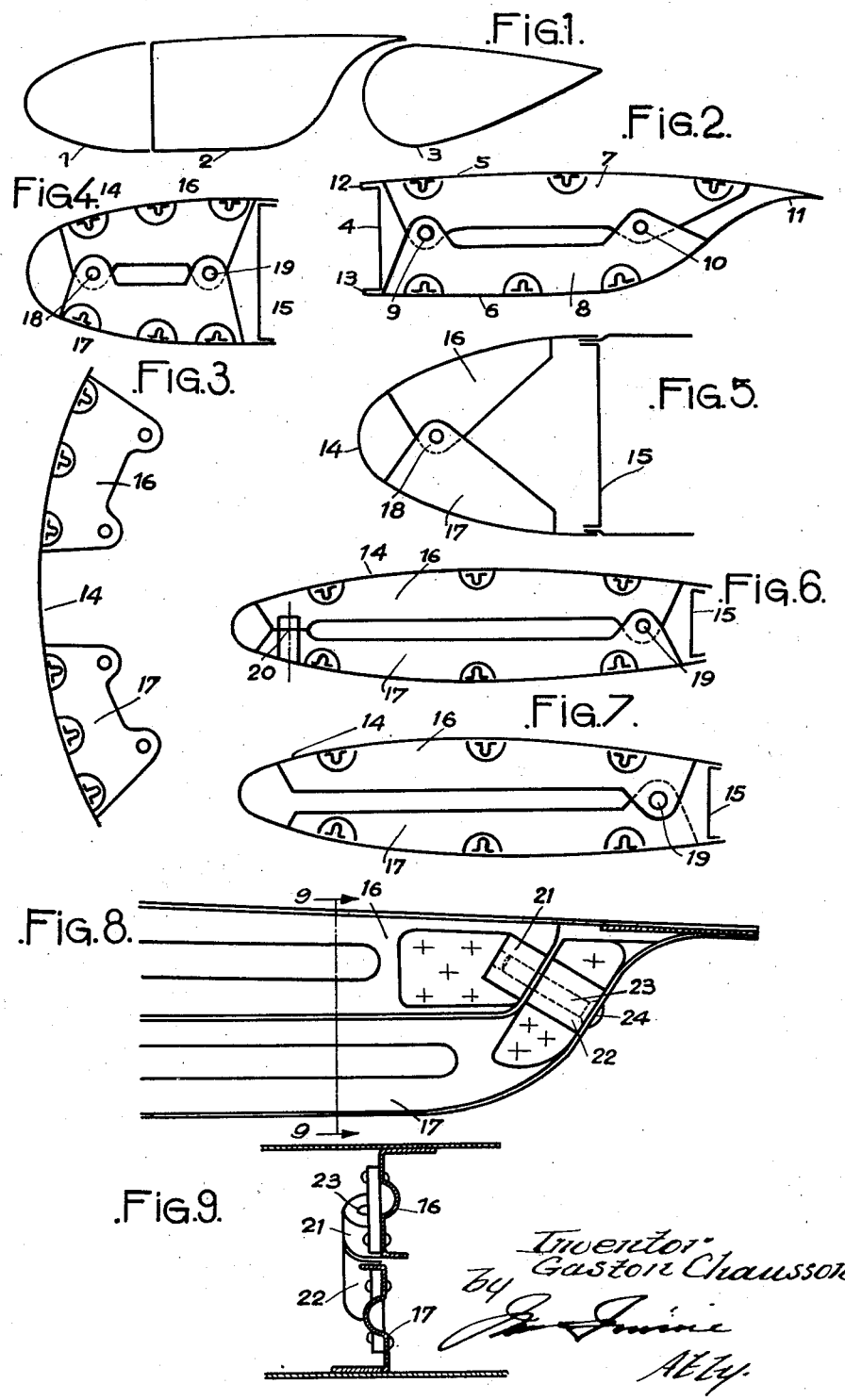

Patented July 3, 1951

2,558,819

UNITED STATES PATENT OFFICE 2,558,819

AIRFOIL STRUCTURE AND METHOD OF MAKING SAME

Gaston Chausson, Asnieres, France, assignor to Societe Anonyme des Usines Chausson, Asnieres, France, a company of France Application November 30, 1945, Serial No. 631,888
In France October 19, 1943

Section 1, Public Law 690, August 8, 1946
Patent expires October 19, 1963

11 Claims. (Cl. 244—124)

This invention relates to airfoil structures for aircraft and more particularly to wings and control flaps which comprise a working covering and longitudinal and transversal reinforcing elements as well as to a method for making such structures.

In airfoil wing structures of this type, the bending strains are resisted by a suitably stiffened covering, with the exception of large sections thereof which are reinforced by the end flanges of spars. Such structures are gaining wider use because of their great stiffness and the simplicity of their construction.

These wing structures generally comprise tranversal stiffening elements such as ribs which are adapted to maintain the profile of the wing. In a typical box-wing having four faces and including two spars and two covering sheets, the connection between the ribs and the faces is effected rather easily for three of the latter, but the closure of the fourth face and of its connection with the ribs remains difficult to effect. It is the general practice to use numerous screws and set-nuts securing the ribs, but this is disadvantageous because of the weight, the aero-dynamic resistance and especially the high cost of manufacture.

It is the principal object of the present invention to provide a simplified wing structure and to reduce the cost of manufacture of the wing structure by limiting the number of parts and individual assemblies thereof to a minimum.

For this purpose, according to the invention, a wing is formed of partial units, the form of which is such that their elements can be assembled by machines having a large output such as riveting and welding machines, said partial units being capable of assembly to form boxes which constitute the wing surfaces and which may be assembled for forming the wing, all these assemblies being effected by means of easily accessible parts of the partial units and boxes and which may be machine fabricated. The partial units are devised, more particularly, so as to avoid the assemblies of pieces having faces which are inaccessible or accessible only with difficulty.

According to the invention, a wing may comprise a plurality of box-like sections formed of two elements comprising the upper and the lower covering respectively, each of said elements being provided with longitudinal stiffeners and transversal half-ribs which are connected to form whole ribs by means of suitable fasteners at a minimum of points, preferably not more than two points.

The leading edge box-section of the wing is formed of a single metal sheet covering that is curved back and provided with longitudinal stiffeners and transversal half-ribs assembled with one another by means of suitable fasteners and behind which a reinforcing web may be placed. In addition, a second sheet, or double-thickness, may be provided for the metal sheet covering at the curved region forming the leading edge, and said doubling element is, preferably, previously curved or profiled in order to form a templet for the curving of said sheet.

For the middle box-section, narrow reinforcing plates are placed between the front extremities of the upper and lower coverings in the region of the half-ribs, said reinforcing plates being fastened on the spar forming the front end of the box with which the separately made leading edge unit is connected.

Likewise, for the trailing box-section, narrow reinforcing plates are secured to the upper and to the lower coverings near their trailing edges in the regions of the ribs, the reinforced edges of the upper and lower coverings then being secured together.

The invention covers other forms of execution and assembling means for the assembly of the partial units and of the box sections forming the wing.

Further features and advantages of the invention will be gathered from the following specification when read in connection with drawings, in which the invention is illustrated by way of example:

Fig. 1 is a diagrammatic view showing the outline or profile of a conventional wing.

Fig. 2 is a side view in elevation of the preferred form of an elemental wing box.

Figs. 3 and 4 are side views in elevation of the assembly for forming the leading edge of a wing in the form of a box.

Fig. 5 is a side view in elevation of a modification of the leading edge assembly.

Fig. 6 is a side view in elevation of the assembly for a control flap.

Fig. 7 is a side view in elevation of a modification of the control flap.

Fig. 8 is a side view in elevation of a fastening device.

Fig. 9 is a cross-sectional view taken on line 9—9 of Fig. 8 and showing in elevation the fastening device illustrated in Fig. 8.

Figs. 10 and 11 are side views in elevation of another modification of a leading edge assembly.

Fig. 12 is a side view in elevation of a fastening device.

Fig. 13 is a cross-sectional view taken on line XIII—XIII of Fig. 12.

Figure 14:
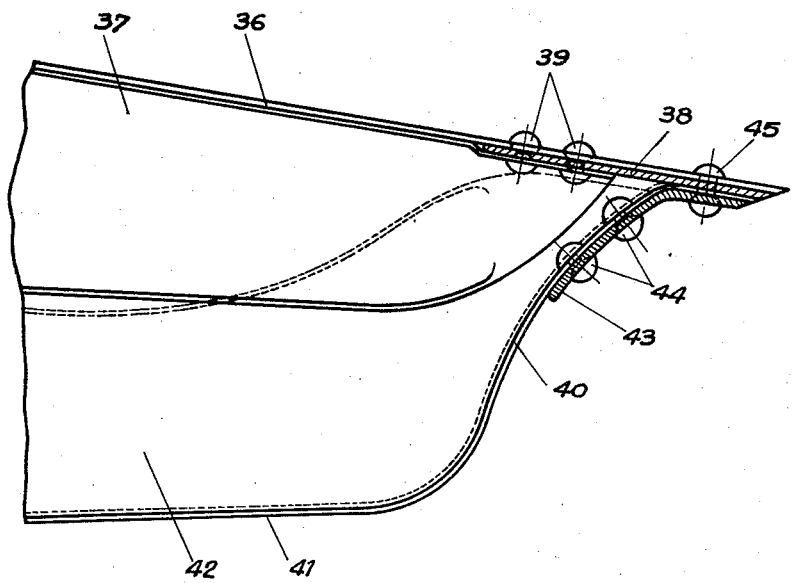
Fig. 14 is a fragmentary cross-sectional view taken through the trailing edge of a wing surface.

A conventional wing generally comprises a leading edge, one or more spars or a box-wing generally forming the middle resisting structure, a warping or hyperlifting device in back of the resisting structure and which generally consists of a movable flap, and a part fitted behind or forming the trailing edge of the resisting structure which is light in weight and formed as a deflector for insuring a good supply of air to the flap. The section of a tail structure generally comprises similar elements.

In a section of a wing having the profile or outline shown in Fig. 1 the principal elements, according to the invention, will be reduced in number to three at most, a leading edge unit 1, a middle box part 2, the back of which forms a deflector, and a flap 3. In the case of a wing, the bending strains are primarily absorbed by the box-wing 2, however, in some cases they are absorbed by the leading edge portion, or by both together.

In a resisting structure comprising a middle box-wing and made according to the invention, as shown in Fig. 2, the principal elements are three in number, a front web or spar 4, an upper covering 5 and a lower covering 6 having its rear portion curved upwardly to form a deflector for the hyperlifting or warping flap 3. Thus, a single piece forming the lower covering 6 is substituted for three elements of the usual prior art constructions, namely, the lower covering, the back spar and the flap deflector, which elements often were formed themselves of a plurality of parts. Each rib of this new assembly which forms the middle box-wing is formed of two half-ribs 7 and 8 secured on the coverings 5 and 6 respectively, each of said half-ribs, having two extended portions to overlap each other to be directly connected together by fasteners 9 and 10 such as bolts or rivets.

In order to effect the assembly of the box wing each covering 5 and 6 first receives stiffeners, and then half-ribs are secured thereto, the organization being such that welding or riveting points are accessible for automatic machine fabrication. Both coverings are then secured along the back flight edge 11, which may be done by machines having large outputs as, for instance, a disc welding machine. Then the half-ribs are joined by means of fasteners 9 and 10, such as bolts or rivets, the total number of which for the whole wing structure is small—some half score for a wing—and which are easily accessible. Finally, the box wing is closed by installing the front web 4 and securing it with the surface coverings 5 and 6 by overlapping folds 12 and 13, which may be fixed as by disc welding or by other assembling means.

The half-ribs 7 and 8, joined at 9 and 10, constitute a non-deformable assembly which insures the permanence of form necessary for the sections of hollow bodies which must support a general torsion, provided that local reinforcements are judiciously arranged at the points of application of the concentrated stresses. Likewise, the absence of the connection generally existing between the ribs 7 and 8 and the vertical web 4, by which the manufacture has previously been most complicated in the former constructions, does not impede the system of being statistically determined, but it is preferable that the joints 11, 12, 13 be rigid so that they can transmit greater stresses than those of which the typical constructions are capable.

In case the resisting structure of a wing is formed as the leading edge unit, as shown in Figs. 3 and 4, it will be possible to use a single stiffened covering sheet 14, a rear web 15 and half-ribs 16 and 17 assembled by means of fasteners 18 and 19.

In the prior art leading edge structures, difficulties are encountered in making an economical assembly of the covering with the stiffeners or the ribs in the immediate neighborhood of the leading edge since the lack of thickness of the profile does not permit the application of the electrodes of a welding machine, the head of an automatic riveting machine, or even a riveting C-device.

According to the invention, this structure may easily be assembled by spacing the half-ribs from the point where the radius of curvature of the profile diminishes rapidly. One then forms a developed sheet provided with its stiffeners and its half-ribs, as shown in Fig. 4, in which the radius of curvature remains of the same order of magnitude throughout. Then this stiffened sheet is rolled on a form of the leading edge, generally with a radius varying along the span to bring it to the profile of Fig. 4, which is then non-deformably maintained by inserting the bolts or rivets 18 and 19. Where necessary a reinforcement of the covering sheet may be provided by a second sheet in the region of the leading edge which is not supported by the ribs.

When a metallic leading edge structure is combined with a resisting box such as that shown in Fig. 2, in which case the leading edge structure resists only the local bending strains in planes parallel to those of the ribs, the structure can be simplified as shown in Fig. 5, wherein the connection is effected by means of a single rivet or bolt 18. However, the method of construction by an initial expansion, as shown in Fig. 3, will always be used.

The construction of the wing control surfaces or flaps, either horizontal or vertical, can be effected in the same manner as described above for the wings, and the vertical web may be eliminated from the hollow body, as mentioned above. The construction is then completed in a manner similar to that which has been described for the leading edge structure of the wing and comprising a single sheet provided with stiffeners and half-ribs and having a substantially constant radius of curvature, and then folding said sheet along the radius of the leading edge and joining the half-ribs together.

In this case, the torsion strains are considerable and a structure similar to that of Fig. 3 can be employed as shown in Fig. 6 wherein the half-ribs are connected at 19 and 20.

In most cases, however, the most satisfactory arrangement is that shown in Fig. 7, where the front fastening 18 is eliminated, and thereby saves time in the manufacture. Indeed, the only deformation possible for the profile, both half-ribs being rigid, would be a flattening or a swelling substantially symmetrical through the relative rotation of both half-ribs about the center 19. But, on the one hand, the torsion to which the wing structure is subjected generally induces dissymmetrical deformations in the sections of the hollow bodies and, on the other hand, the leading edge structure is sufficiently strong to withstand these strains because of its stiffness due to its small radius of curvature and its distance from the center of rotation.

Consequently, the present methods of construction are applicable in all cases for the fabrication of wings, flaps or wing control surfaces.

Cases of execution can arise in which the assembly of the half-ribs by means of bolts or rivets can be effected only with difficulty owing to their inaccessibility. In this case the invention includes a modification of the connecting fastener construction that is indicated at 20 in Fig. 6 and shown in detail in a slightly different application in Figs. 8 and 9. This modification comprises two threaded bosses 21 and 22 secured on the half-ribs, preferably by means of machines to increase the output, and in connecting them by a threaded member 23, the head 24 of which is easily accessible outside the box structure but which creates no aerodynamic defectiveness. In Fig. 6, this boss connection is indicated as forming the front connection of the half-ribs with the threaded member extending through the lower covering into the bosses, whereas in Figs. 8 and 9 the bosses are shown as forming the rear connection for the half-ribs and being located adjacent the trailing edge of the wing structure.

In Figs. 10 and 11 the leading edge structure of a wing is formed by folding a working covering 25 provided with two half-ribs 26, 27. In addition, a doubling metal piece 28, secured on the covering 25 is previously curved or profiled so as to avoid a stress in its folding during the final formation of the leading edge. Said piece 28 is preferably secured on the covering sheet 25 in order to serve as a support during the curving of the latter. The piece 28 can be connected with the corresponding half-rib 26, as shown in Figs. 10 and 11, in order to insure a good distribution of the stresses.

It is also possible to use pieces 28 having a sufficient thickness for considerably reinforcing the leading edge of the wing.

Said leading edge structure is made, as explained with reference to Figs. 3 and 4, by mounting the half-ribs 26, 27 and the piece 28 to the covering 25 while it is flat (Fig. 10) and then curving back the covering 25, whereupon the half-ribs 26, 27 are joined at 29.

Figs. 12 and 13 show a modification of the assembly of Figs. 8 and 9. Here, both half-ribs 26, 27 receive bosses 30, 31 arranged to axially align upon assembly of the units comprising the coverings 32, 33. The spar 34 is provided with one or more holes located to be aligned with tappings in the bosses 30, 31 for the passage of a screw 35 which can be easily inserted from the outside, and thereby simultaneously joining the half-ribs 26 and 27 and the spar 34. This latter can be conveniently reinforced around the assembling hole for insuring the transmission of the localized stresses to the whole of the section. This mode of assembly considerably increases the resistance of the whole and facilitates the making of the boxes in certain cases of difficult assemblies.

According to Fig. 2 a front fastener 9 connects the half-ribs 7 and 8, said connection being such that it does not affect the front spar 4, while according to Fig. 12 a connection 35 is provided which connects the half-ribs 26 and 27 with the front spar 34. Furthermore, in Figs. 8 and 9 a rear connection such as the parts 21, 22, 23 has been provided, which connects the half-ribs 16 and 17 with the curved part of the lower covering of the wing surface.

Connections which thus affect both half-ribs together with the small front spar or the covering of the trailing edge are particularly advantageous when considerable localized torsion strains are developed in the structure, for they permit a direct transmission of the stresses developed in the rib to the small front spar or to the metal sheet covering of the trailing edge which takes the place of the same in the rear part without resorting to the transmission of stresses to the covering sheet, and which is very thin and thus receives strains perpendicular to its plane when the connection of both half-ribs is not connected with the spar, as in the first mentioned case. The construction according to Fig. 2 in which the half-ribs 7 and 8 are rendered fast with one another through a connection which does not include the small spar 4, however, has the advantages of being very light and involving a moderate cost of manufacture.

Figure 15:
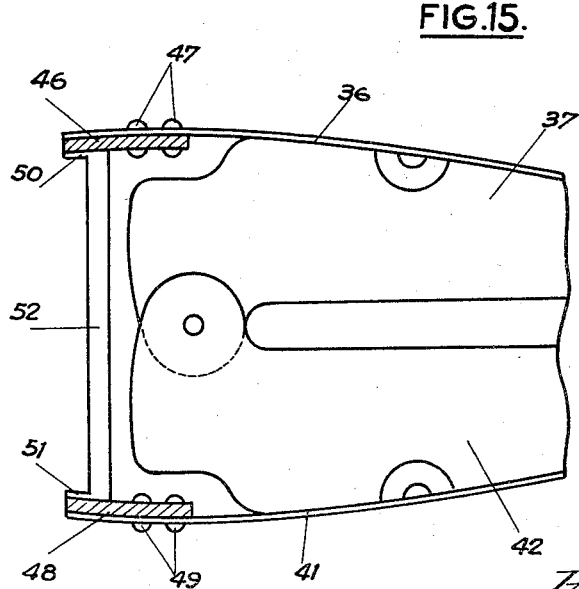
Fig. 15 is a fragmentary side view in elevation of a box forming the chief part of a wing surface.

The structure shown in Figs. 14 and 15 provides front and rear connections offering a greater resistance and the use of which will, therefore, be advantageous in cases in which the wing will be subjected to considerable stresses. In Fig. 14, the upper covering 36 of the wing surface, which comprises a half-rib 37, is provided with a narrow reinforcing plate 38 secured by means of rivets 39. On its side the arched part 40 of the lower covering 41 of the wing surface is reinforced by ribs 42 and is provided with a narrow reinforcing plate 43 secured by means of rivets 44. These reinforced edges of the covering of the wing surface are joined by means of rivets 45. Both rigid plates 38 and 43 are capable of locally transmitting stresses which are perpendicular to their plane.

According to Fig. 15, the upper covering 36 which comprises a half-rib 37 is provided along its front edge with a narrow reinforcing plate 46 secured by means of rivets 47, and the lower covering 41 which comprises a half-rib 42 is also provided with a narrow reinforcing plate 48 secured by means of rivets 49. Both these narrow reinforcing plates 46 and 48 are fastened, as by welding, to the flanges 50 and 51 of the small spar 52.

The small reinforcing plates 38, 43 and 46, 48 are placed, preferably, only at the point of the ribs where the working coverings are submitted to the greatest stresses. These narrow plates are preferably in the form of a continuous strip extending the whole length of the span so that each strip is subjected to the general bending of the whole box forming the wing surface. It is obvious that the use of the narrow reinforcing plates or bands is applicable irrespectively of the form or the manner of joining the half-ribs. Likewise, the fastening of the narrow reinforcing plates or strips on the covering sheets and on the small spar can be effected by any suitable means such as welding or by rivets and the like.

A wing in accordance with the present invention can be made in an exceedingly simple manner and possesses an increased rigidity which makes it possible to reduce the thickness of the covering sheets.

Moreover, the invention is not limited to the examples of execution which have been shown and described, for it is obvious that various modifications and numerous forms of execution can be made without departing from the scope and spirit of the invention.

What I claim and desire to secure by Letters Patent of the United States is:

1. A box-like airfoil structure for an aircraft, comprising, in combination, a leading edge member formed of a single covering metal sheet, longitudinal stiffeners and transverse half-ribs secured on the inner face of said sheet, the middle part of said sheet being curved so as to bring together parts of said half-ribs, means connecting said parts of said half-ribs at least in one place, and a middle box formed of two elements consisting one of the upper and the other of the lower covering, each of said coverings being provided on their inner face with longitudinal stiffeners and transverse half-ribs, and means connecting adjacent parts of said half-ribs.

2. A box-like airfoil structure for aircraft according to claim 1, in which said upper and lower coverings are tapered toward each other to form a deflector at their rear edges.

3. A box-like airfoil structure for aircraft according to claim 1, comprising a spar between said upper and lower coverings at the front end of the middle box.

4. A box-like air foil structure for aircraft according to claim 1, comprising a spar between the two rear marginal parts of said leading edge member.

5. A box-like airfoil structure for aircraft, comprising in combination, a leading edge member formed of a single covering metal sheet, longitudinal stiffeners and transverse half-ribs secured on the inner face of said sheet, the middle part of said sheet being curved so as to bring together parts of said half-ribs, means connecting said parts of said half ribs at least in one place, an inner reinforcing metal piece in the curved region of said member, a middle box member, and a trailing edge member.

6. A box-like airfoil structure for an aircraft, comprising, in combination, a leading edge member formed of a single covering metal sheet, longitudinal stiffeners and transverse half-ribs secured on the inner face of said sheet, the middle part of said sheet being curved so as to bring together parts of said half-ribs, means connecting said parts of said half-ribs at least in one place, a middle box formed of two elements consisting one of the upper and the other of the lower covering, each of them being provided on their inner face with longitudinal stiffeners and transverse half-ribs, means connecting adjacent parts of said half-ribs, and a trailing edge member formed of two elements consisting one of the upper and the other of the lower covering, each of them being provided on their inner face with longitudinal stiffeners and transverse half-ribs, a spar between the front marginal parts of said coverings and means connecting adjacent parts of said half-ribs.

7. A box-like airfoil structure for aircraft, comprising partial units combined to form an airfoil structure with a trailing edge, each of said units having a covering, longitudinal stiffeners and transverse half-ribs secured to the inner face of said covering, means for connecting two superimposed half-ribs, reinforcing plates secured to the upper and to the lower coverings near the trailing edge in the region of the ribs, and means for connecting together both thus reinforced extremities of the upper and lower coverings.

8. A box-like airfoil structure for aircraft, comprising partial units including a leading edge, a middle box, a flap, each having metal sheet coverings, longitudinal stiffeners and transverse half-ribs secured to said coverings, means assembling adjacent parts of said half-ribs, a spar at the front end of the middle box, reinforcing plates between the front marginal parts of the upper and lower coverings in the region of the half-ribs, said plates being fastened on the spar forming the front end of the box with which the separately made leading edge is connected.

9. A box-like airfoil structure for aircraft according to claim 8, wherein said reinforcing plates comprise narrow rigid strips each extending along the whole length of the spar.

10. An aircraft airfoil structure comprising spaced cover portions, half-ribs secured to said cover portions respectively, pairs of said half ribs being superimposed and extending toward each other with their adjacent inner edges in spaced relation, a brace member extending between said cover portions adjacent said half-ribs, bosses fixed to the inner edge of each of half-ribs and having their axes extending parallel with said ribs, said bosses being secured to the opposite sides of each pair of said half-ribs and being offset for axial alignment, and fastening means extending through said brace member and axially through said bosses to secure said ribs and brace member together.

11. The method of forming an airfoil structure which comprises providing a single cover sheet of selected size, securing half-ribs to the opposite end portions of said sheet and in spaced end-to-end relation to leave the middle portion of said sheet unobstructed, bending said sheet along its unobstructed middle to form the leading edge of the structure and to position said half-ribs in superimposed contacting relation with said sheet, end portions spaced to form the airfoil surfaces, and securing said contacting half-ribs together in at least one place.

GASTON CHAUSSON.

REFERENCES CITED

The following references are of record in the file of this patent:

UNITED STATES PATENTS

| Number | Name | Date |
|---|---|---|
| 1,795,970 | Rohrbach | Mar. 10, 1931 |
| 1,854,330 | Delage | Apr. 19, 1932 |
| 1,890,820 | Markey | Dec. 13, 1932 |
| 2,390,730 | Northrop et al. | Dec. 11, 1945 |
| 2,403,569 | Watter | July 9, 1946 |

FOREIGN PATENTS

| Number | Country | Date |
|---|---|---|
| 471,514 | Great Britain | Sept. 6, 1937 |
| 705,562 | France | Mar. 10, 1931 |